United States Patent

Shin

(10) Patent No.: US 7,825,789 B2
(45) Date of Patent: Nov. 2, 2010

(54) SYSTEM AND METHOD FOR DETECTING WHETHER SEAT BELT IS WORN

(75) Inventor: Dal Soo Shin, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 330 days.

(21) Appl. No.: 11/966,035

(22) Filed: Dec. 28, 2007

(65) Prior Publication Data

US 2009/0058627 A1 Mar. 5, 2009

(30) Foreign Application Priority Data

Sep. 4, 2007 (KR) ................ 10-2007-0089336

(51) Int. Cl.
*B60Q 1/00* (2006.01)
*B60R 22/34* (2006.01)
*B60R 21/00* (2006.01)
(52) U.S. Cl. .............. 340/457.1; 340/457; 180/268; 280/807
(58) Field of Classification Search ............. 340/457.1
See application file for complete search history.

(56) References Cited

U.S. PATENT DOCUMENTS

| 6,498,562 | B2 * | 12/2002 | Yano ................ 340/457.1 |
| 6,907,646 | B2 * | 6/2005 | Lee et al. ................ 24/633 |
| 2002/0042561 | A1 * | 4/2002 | Schulman et al. ........... 600/345 |
| 2005/0012605 | A1 * | 1/2005 | Ohtomo et al. .......... 340/457.1 |
| 2006/0157968 | A1 * | 7/2006 | Kitazawa .................... 280/806 |

* cited by examiner

*Primary Examiner*—Benjamin C Lee
*Assistant Examiner*—Andrew Bee
(74) *Attorney, Agent, or Firm*—Morgan, Lewis & Bockius LLP

(57) ABSTRACT

A system and method of detecting whether a seat belt is worn is disclosed. The system includes a contact type sensor and a non-contact type sensor installed in a seat belt buckle. A Body Control Module (BCM) receives a signal from the contact type sensor and transmitting the signal to a cluster. An airbag control unit receives a signal from the non-contact type sensor. The seat belt control unit determines whether a seat belt is worn using a signal received from the cluster when an ignition key is off, and determines whether the seat belt is worn using a signal received from the airbag control unit when the ignition key is on.

2 Claims, 1 Drawing Sheet

SYSTEM AND METHOD FOR DETECTING WHETHER SEAT BELT IS WORN

CROSS-REFERENCE TO RELATED APPLICATIONS

This application claims priority to Korean Application No. 10-2007-0089336, filed on Sep. 4, 2007, the disclosure of which is incorporated herein by reference.

BACKGROUND OF THE INVENTION

1. Field of the Invention

The present invention relates to a system and method for detecting a seat belt, and more particularly, to a system and method for detecting whether a seat belt is worn both in an ignition-on state and in an ignition-off state in order to support various functions that increase the safety and convenience of vehicle occupants.

2. Description of the Related Art

For their safety, vehicle occupants should wear seat belts, and are compulsorily required to wear the seat belts as their duty of law. Accordingly, vehicle makers have recently applied various devices and systems related to seat belts to vehicles so as to more reliably protect vehicle occupants from ear accidents.

However, in order to perform such safety functions, whether occupants are wearing seat belts is one of the most significant factors to determine the safety of the occupants. Further, only when whether occupants wear seat belts has been reliably determined can a warning be provided to occupants who do not wear seat belts or can the occupants can be prompted to wear seat belts.

U.S. Pat. No. 6,079,744 (issued on Jun. 27, 2000) discloses a device for detecting whether a seat belt is worn using a non-contact type sensor installed in a seat belt buckle, and will be referred to in order to facilitate an understanding of the present invention.

However, the conventional device for detecting whether a seat belt is worn is characterized in mat it only pertains to a determination of whether a seat belt is being worn in an ignition-on state, but has no provision for determination of whether a seat belt is worn both in an ignition-on state and in an ignition-off state, and offering of convenience, as well as safely, to a vehicle occupant.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Accordingly, the present invention has been made keeping in mind the above problems occurring in the prior art, and an object of the present invention is to provide a system and method for detecting whether a seat belt is worn, which can detect whether a vehicle occupant is wearing a seat belt both in an ignition-on state and in an ignition-off state in order to support various functions that increase the safety and convenience of vehicle occupants.

In order to accomplish the above object, the present invention provides a system for detecting whether a seat belt is worn, comprising a contact type sensor and a non-contact type sensor installed in a seat belt buckle; a Body Control Module (BCM) for receiving a signal from the contact type sensor and transmitting the signal to a cluster; an airbag control unit for receiving a signal from the non-contact type sensor; and a seat belt control unit for determining whether a seat belt is worn using the signal received from the cluster when an ignition key is off, and determining whether the seat belt is worn using the signal received from the airbag control unit when the ignition key is on.

Further, the present invention provides a method of detecting whether a seat belt is worn, comprising receiving signals from a contact type sensor and a non-contact type sensor; determining whether ignition is on or off; determining whether a seat belt is worn on a basis of the signal that is detected by the non-contact type sensor installed in a seat belt buckle and is received through an airbag control unit, if it is determined that the ignition key is on; and determining whether a seat belt is worn on a basis of the signal that is detected by the contact type sensor installed in the seat belt buckle and is received through a cluster, if it is determined that the ignition key is off.

A slack removal function, described in the present invention, denotes a function of driving a motor installed on a seat belt and suitably rewinding the seat belt in order to remove the slack from the seal belt when the seat belt worn by a vehicle occupant is slack. Further, a parking function described in the present invention denotes a function of rewinding and returning the seat belt to the initial position thereof when the vehicle occupant gets out of a vehicle after the ignition is off.

BRIEF DESCRIPTION OF THE DRAWINGS

The above and other features of the present invention will now be described in detail with reference to certain exemplary embodiments thereof illustrated the accompanying drawing which is given hereinbelow by way of illustration, and thus are not limitative of the present invention, and wherein.

Figure 1:
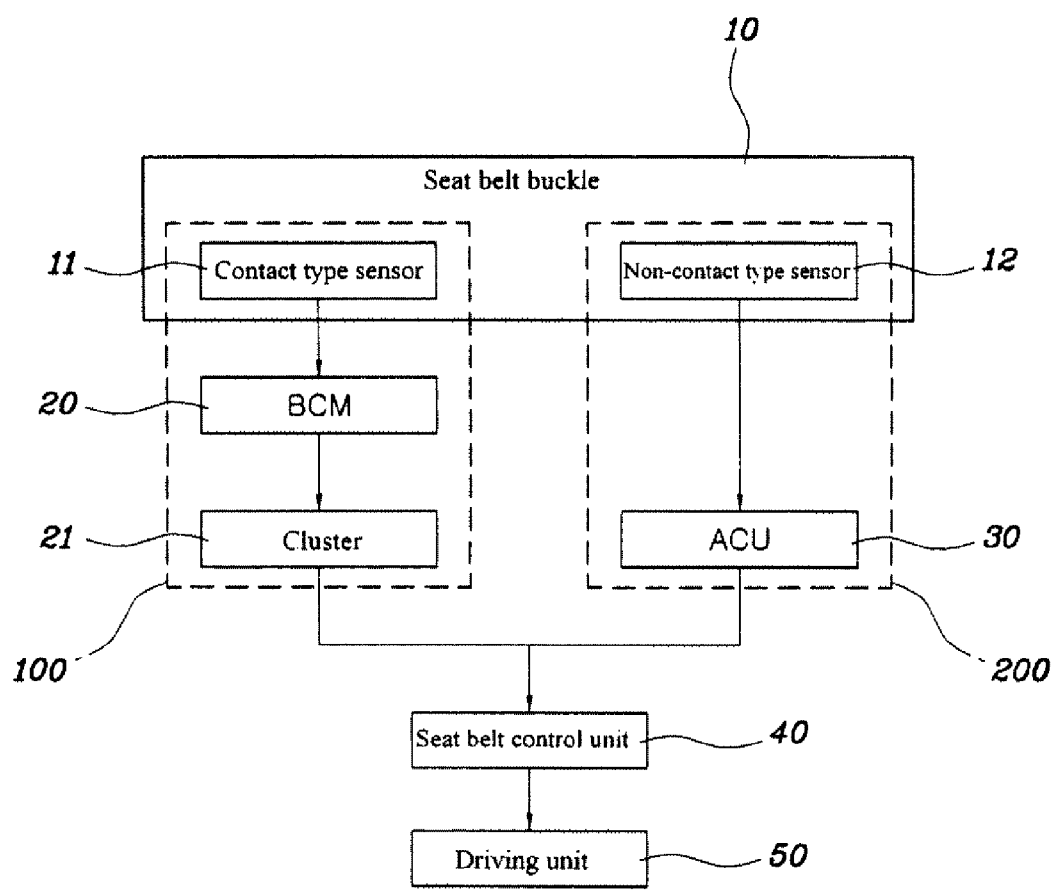
FIG. 1 is a conceptual diagram showing a system for detecting whether a seat belt is worn both in an ignition-on state and an ignition-off state according to an exemplary embodiment of the present invention.

It should be understood that the appended drawing is not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several FIGURES of the drawing.

DESCRIPTION OF THE PREFERRED EMBODIMENTS

Reference will now be made in detail to a preferred embodiment of the present invention, an example of which is illustrated in the accompanying drawing and described below. While the invention will be described in conjunction with an exemplary embodiment, it should be understood that the description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

First, with reference to FIG. 1, a system for detecting whether a seat belt is worn is described below. FIG. 1 is a conceptual diagram showing a system for detecting whether a seal belt is worn both in an ignition-on state and an ignition-off state according to an exemplary embodiment of the present invention.

The detection system, according to an exemplary embodiment of the present invention, includes an ignition (IGN)-OFF unit 100 operated in an ignition key-off state, an IGN-ON unit 200 operated in an ignition key-on state, and a seat belt control unit 40.

The IGN-OFF unit 100 is supplied with electrical power from a battery so that it can be operated even when an ignition key is off and includes a contact type sensor 11, a Body Control Module (BCM) 20, and a cluster 21.

The contact type sensor 11 may be installed in, for example, a seal belt buckle 10, and may be a typical buckle switch for determining whether a buckle tongue is inserted into the seat belt buckle through a contact point.

The BCM 20 is a control module for integrally controlling the operations of a variety of vehicle parts and available devices for safe traveling, and is electrically connected to the contact-type sensor 11 through a wire harness. Such a BCM 20 can be regarded as an integrated structure of an Electronic Control Unit (ECU), and can be designed using various methods according to the prior art.

The cluster 21 is a device including therein instruments for providing information about the status of a vehicle, and is configured to receive signals from the BCM 20 and to display various types of information on an instrument panel of the vehicle.

The seat belt control unit 40 determines whether an occupant is wearing a seat belt by using signals received from the sensors 11 and 12, installed in the seat belt buckle 10, and performs various types of functions for providing safety and convenience to the occupant depending on whether the occupant is wearing the seat belt.

As safety functions, a belt slack removal function can be primarily taken into consideration, and as convenience functions, a belt parking function can be primarily taken into consideration. These functions are performed by causing the seat belt control unit 40 to control the driving unit 50 so that the seat belt is rewound. Of source, the seat belt control unit 40 can perform various functions related to the seat belt, such as providing a warning in various forms, when the occupant is not wearing the seat belt.

The seat belt control unit 40 receives the signal from the contact type sensor 11 through the cluster 21 in an ignition key-off state, thus determining whether the occupant is wearing the seat belt.

The IGN-ON unit 200 is supplied with electrical power in an IGN-ON state and is operated thereby, and is not operated when the ignition key is off. The IGN-ON unit 200 includes a non-contact type sensor 12 and an airbag control unit (ACU) 30.

The non-contact type sensor 12 may be installed in, for example, the seat belt buckle 10, and may be a typical hall sensor that uses electromagnetic transformation principles. In an ignition key-ON stale, the signal from the non-contact-type sensor 12 is considered to have higher priority than the signal from the contact type sensor 11 of the IGN-OFF unit 100. The contact type sensor 11 may frequently cause abnormalities, such as the short circuit of a contact point, and these abnormalities cannot be checked in the prior art when they occur. According to the present invention, this problem can be solved as explained hereinafter.

The airbag control unit 30 is a unit for controlling the operation of an airbag when a vehicle accident occurs, and is widely known as a representative safely device, and thus a detailed description thereof is omitted. The airbag control unit 30 is electrically connected to the non-contact type sensor 12 through a wire harness, and is configured to transmit the signal, received from the non-contact type sensor 12, to the seat belt control unit 40.

The seat belt control unit 40 determines whether a vehicle occupant is wearing a seat belt on, using the signal received from the airbag control unit (ACU) 30, in an ignition key ON-state and determines whether a vehicle occupant is wearing a seat belt off, using the signal received from the cluster 21, in an ignition key OFF-state.

Further, if necessary, the seat belt control unit 40 compares the signal received from the BCM 20 of the IGN-OFF unit 100 with the signal received from the airbag control unit 30 of the IGN-ON unit 200, thus determining whether an abnormality occurs in the contact type sensor 11.

In particular, after the ignition key is off, the signal received from the contact type sensor 11 of the IGN-OFF unit 100 is determined to be an error and is ignored when the most recent signals detected by the contact type sensor 11 of the IGN-OFF unit 100 and the non-contact type sensor 12 of the IGN-ON unit 200, respectively, before the ignition is off, are different from each other.

Next, with reference to FIG. 1, the method of detecting whether a seat belt is worn is described in detail. In the following description, respective steps are not necessarily arranged in the sequence of temporal processing.

First step: The seat belt control unit 40 receives signals from both the contact type sensor 11 of the IGN-OFF unit 100 and the non-contact type sensor 12 of the IGN-ON unit 200.

Second step: The seat belt control unit 40 determines whether the ignition is on or off.

When the ignition key is on, the seat belt control unit 40 determines whether an occupant is wearing the seat belt on the basis of the signal that is detected by the non-contact type sensor 12 installed in the seat belt buckle 10 and is received through the airbag control unit 30. The signal received from the contact type sensor 11 of the IGN-OFF unit 100 is ignored when the ignition key is on.

When the ignition key is off, the seat belt control unit 40 determines whether the occupant is wearing the seat belt on the basis of the signal that is detected by the contact type sensor 11 installed in the seat belt buckle 10 and is received through the BCM 20 and the cluster 21.

Meanwhile, as described above with reference to the system, if necessary, the seat belt control unit 40 compares the signals received both from the contact type sensor 11 and from the non-contact type sensor 12, with each other, thus determining whether an abnormality is occurring in the contact type sensor 11. In this case, the signal received from the non-contact type sensor 12 is considered to have higher priority than the signal received from the contact type sensor 11.

Third step: The seat belt control unit 40 performs various functions related to the seat belt depending on the ON/OFF state of the ignition key, the wearing of the seat belt by the occupant, or other vehicle traveling states.

The functions may include various functions, such as a slack removal function, a parking function, a warning function, etc.

As described above, the present invention provides a system and method for detecting whether a seat belt is worn, which detects whether a seat belt is worn both in an ignition-on suite and in an ignition-off state, thus suitably performing functions that increase the safety and convenience of vehicle occupants.

Further, the present invention is advantageous in that an abnormality in a contact type sensor, which frequently occurs due to the short circuit of a contact point or the like, can be detected.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for detecting whether a seat belt is worn, comprising:
    a contact type sensor and a non-contact type sensor installed in a seat belt buckle, wherein the contact type sensor is supplied with power from a vehicle battery even when an ignition key is on;
    a Body Control Module (BCM) for receiving a signal from the contact type sensor and transmitting the signal to a cluster;
    an airbag control unit for receiving a signal from the non-contact type sensor; and
    a seat belt control unit for receiving the signals from the cluster and the airbag control unit, and determining whether the seat belt is worn using the signal received from the cluster when an ignition key is off, and determining whether the seat belt is worn, using the signal received from the airbag control unit when the ignition key is on;
    wherein the seat belt control unit is configured to perform at least a slack removal function if it is determined that the seat belt is worn when the ignition key is on, and perform at least a parking function if it is determined that the seat belt is not worn when the ignition key is off, and
    wherein the seat belt control unit, after the ignition key is off, considers the signal received from the contact type sensor to be an error and ignores the signal of the contact type sensor, when final signals detected by the contact type sensor and the non-contact type sensor, respectively, before the ignition key is off, are different from each other.

2. A method of detecting whether a seat belt is worn, comprising: receiving signals from a contact type sensor and a non-contact type sensor;
    determining whether an ignition key is on or off;
    determining whether the seat belt is worn on a basis of the signal that is detected by the non-contact type sensor installed in a seat belt buckle and is received through an airbag control unit, after the ignition key is on, wherein the contact type sensor is supplied with power from a vehicle battery even when the ignition key is off and the non-contact type sensor is supplied with power when the ignition key is on; and
    determining whether the seat belt is worn on a basis of the signal that is detected by the contact type sensor installed in the seat belt buckle and is received through a cluster, after the ignition key is off,
    wherein after the ignition key is off, the signal received from the contact type sensor is determined to be an error and is ignored when final signals detected by the contact type sensor and the non-contact type sensor, respectively, before the ignition key is off, are different from each other.

* * * * *